(12) United States Patent
Withanage Don et al.

(10) Patent No.: US 10,175,768 B2
(45) Date of Patent: Jan. 8, 2019

(54) GESTURE RECOGNITION DEVICES, GESTURE RECOGNITION METHODS, AND COMPUTER READABLE MEDIA

(71) Applicant: SINGAPORE UNIVERSITY OF TECHNOLOGY AND DESIGN, Singapore (SG)

(72) Inventors: Anusha Indrajith Withanage Don, Singapore (SG); Suranga Chandima Nanayakkara, Singapore (SG)

(73) Assignee: Singapore University of Technology and Design, Singapore (SG)

( * ) Notice: Subject to any disclaimer, the term of this patent is extended or adjusted under 35 U.S.C. 154(b) by 12 days.

(21) Appl. No.: 15/532,109

(22) PCT Filed: Dec. 1, 2015

(86) PCT No.: PCT/SG2015/050479
§ 371 (c)(1),
(2) Date: Jun. 1, 2017

(87) PCT Pub. No.: WO2016/089306
PCT Pub. Date: Jun. 9, 2016

(65) Prior Publication Data
US 2017/0269699 A1    Sep. 21, 2017

(30) Foreign Application Priority Data

Dec. 1, 2014  (SG) .......................... 10201407991X

(51) Int. Cl.
*G06F 3/01*  (2006.01)
*G06F 1/32*  (2006.01)
(Continued)

(52) U.S. Cl.
CPC ............ *G06F 3/017* (2013.01); *G06F 1/3262* (2013.01); *G06F 3/0325* (2013.01); *G06F 3/043* (2013.01);
(Continued)

(58) Field of Classification Search
None
See application file for complete search history.

(56) References Cited

U.S. PATENT DOCUMENTS

2013/0141395 A1   6/2013  Holmgren et al.
2014/0014839 A1   1/2014  Chang et al.
(Continued)

OTHER PUBLICATIONS

Piekarski, W., & Thomas, B.H. (2002). Glove Based User Interaction Techniques for Augmented Reality in an Outdoor Environment. Virtual Reality, 6, 167-180.
(Continued)

*Primary Examiner* — Duane N Taylor, Jr.
(74) *Attorney, Agent, or Firm* — Viering, Jentschura & Partner mbB

(57) ABSTRACT

According to various embodiments, a gesture recognition device may be provided. The gesture recognition device may include: a plurality of emitters, each emitter configured to emit a signal; at least one receiver configured to receive signals emitted by the plurality of emitters; a controller configured to control the plurality of emitters to subsequently emit signals in a plurality of patterns of a first subset of the plurality of emitters emitting a signal and a second subset of the plurality of emitters not emitting a signal; and a gesture recognition circuit configured to determine a gesture of a user of the input device based on the signals received by the at least one receiver.

20 Claims, 10 Drawing Sheets

(51) Int. Cl.
*G06F 3/03* (2006.01)
*G06F 3/042* (2006.01)
*G06F 3/043* (2006.01)
*G06K 9/00* (2006.01)
*G06K 9/20* (2006.01)
*G06K 9/62* (2006.01)

(52) U.S. Cl.
CPC ....... *G06F 3/0421* (2013.01); *G06K 9/00355* (2013.01); *G06K 9/00389* (2013.01); *G06K 9/2027* (2013.01); *G06K 9/6269* (2013.01); *G06F 2203/04101* (2013.01); *G06F 2203/04108* (2013.01)

(56) References Cited

U.S. PATENT DOCUMENTS

| | | |
|---|---|---|
| 2014/0036168 A1 | 2/2014 | Ludwig |
| 2014/0168169 A1 | 6/2014 | Drumm |
| 2015/0009120 A1* | 1/2015 | Jiang ................ G06F 3/017 345/156 |

OTHER PUBLICATIONS

Pfeuffer, K., Rukzio, E., & Winkler, C. (2012). Investigating mid-air pointing interaction for projector phones. ITS.

Au, O.K., Fu, H., Tai, C., & Xu, P. (2012). Lazy selection: a scribble-based tool for smart shape elements selection. ACM Trans. Graph., 31, 142:1-142:9.

Agrawala, M., Käser, D.P., & Pauly, M. (2011). FingerGlass: efficient multiscale interaction on multitouch screens. CHI.

Harrison, C., Poupyrev, I., & Sato, M. (2012). Touché: enhancing touch interaction on humans, screens, liquids, and everyday objects. CHI.

Colaço, A.B., Goyal, V.K., & Schmandt, C.M. (2014). Compact and Low-Power Computational 3D Sensors for Gestural Input.

Ashbrook, D., Baudisch, P., and White, S. Nenya: Subtle and eyes-free mobile input with a magnetically-tracked finger ring. In Proc. of CHI '11 (2011), 2043-2046.

Bailly, G., Mller, J., Rohs, M., Wigdor, D., and Kratz, S. ShoeSense: A new perspective on gestural interaction and wearable application. In Proc. of Chi '12 (2012), 1239-1248.

Baraniuk, R. G. Compressive sensing. IEEE signal processing magazine 24, 4 (2007), 118-121.

Bencina, R., Kaltenbrunner, M., and Jorda, S. Improved topological fiducial tracking in the reacTIVision system. In IEEE CVPR Workshops (2005), 99-99.

Butler, A., Izadi, S., and Hodges, S. Sidesight: multi-touch interaction around small devices. In Proc. of UIST'08 (2008), 201-204.

Chan, L., Liang, R.-H., Tsai, M.-C., Cheng, K.-Y., Su, C.-H., Chen, M. Y., Cheng, W.-H., and Chen, B.-Y. FingerPad: Private and subtle interaction using fingertips. In Proc. of UIST '13 (2013), 55-260.

Chen, K.-Y., Lyons, K., White, S., and Patel, S. uTrack: 3d input using two magnetic sensors. In Proc. of UIST'13 (2013), 237-244.

Colaço A., Kirmani, A., Yang, H. S., Gong, N.-W., Schmandt, C., and Goyal, V. K. Mime: Compact, low-power 3d gesture sensing for interaction with head-mounted displays. In Proc. of UIST '13 (2013), 227-236.

Duarte, M., Davenport, M., Takhar, D., Laska, J., Kelly, K., and Baraniuk, R. Single-pixel imaging via compressive sampling. IEEE Signal Processing Magazine 25, 2 (2008), 83-91.

Gustafson, S., Bierwirth, D., and Baudisch, P. Imaginary interfaces: Spatial interaction with empty hands and without visual feedback. In Proc. of UIST '10 (2010), 3-12.

Hall, M., Frank, E., Holmes, G., Pfahringer, B., Reutemann, P., and Witten, I. H. The WEKA data mining software. ACM SIGKDD Explorations Newsletter 11, 1 (2009), 10.

Harrison, C., Benko, H., and Wilson, A. D. OmniTouch: Wearable multitouch interaction everywhere. In Proc. of UIST 11 (2011), 441-450.

Harrison C. and Hudson, S. E. Abracadabra: wireless, high-precision, and unpowered finger input for very small mobile devices. In Proc. of UIST '09 (2009), 121.

Harrison, C., Schwarz, J., and Hudson, S. TapSense: enhancing finger interaction on touch surfaces. In Proc. of UIST '11 (2011), 627-636.

Harrison, C., Tan, D., and Morris, D. Skinput: Appropriating the body as an input surface chris. In Proc. of CHI '10 (2010), 453-462.

Hwang, S., Ahn, M., and Wohn, K.-y. MagGetz: customizable passive tangible controllers on and around conventional mobile devices. In Proc. of UIST '13 (2013) 411-416.

Jones, B., Sodhi, R., Forsyth, D., Bailey, B., and Maciocci, G. Around device interaction for multiscale navigation. In Proc. of MobileHCI '12 (2012), 83-92.

Ketabdar, H., Roshandel, M., and Yksel, K. A. Towards using embedded magnetic field sensor for around mobile device 3d interaction. In Proc. of MobileHCI '10 (2010), 153-156.

Kim, D., Hilliges, O., Izadi, S., Butler, A. D., Chen, J., Oikonomidis, I., and Olivier, P. Digits: freehand 3d interactions anywhere using a wrist-worn gloveless sensor. In Proc. of UIST'12 (2013), 167-176.

Kim, J., He, J., Lyons, K., and Starner, T. The gesture watch: A wireless contact-free gesture based wrist interface. In Proc. of ISWC '07 (2007), 1-8.

Kratz, S., and Rohs, M. Hoverflow: Exploring around-device interaction with IR distance sensors. In Proc. of MobileHCI '09 (2009), 42:1-42:4.

MacKenzie, D. Compressed sensing makes every pixel count. What's Happening in the Mathematical Sciences, Jul. (2009), 114-127.

Mitra, S., and Acharya, T. Gesture recognition: A survey. IEEE Transactions on Systems, Man and Cybernetics, Part C (Applications and Reviews) 27, 3 (May 2007), 311-324.

Nakatsuma, K., Shinoda, H., Makino, Y., Sato, K., and Maeno, T. Touch interface on back of the hand. In proc. of SIGGRAPH '11 (2011), 39:1-39:1.

Nanayakkara, S., Shilkrot, R., Yeo, K. P., and Maes, P. EyeRing: A finger-worn input device for seamless interactions with our surroundings. In Proc. of AH '13 (2013), 13-20.

Olberding, S., Yeo, K. P., Nanayakkara, S., and Steimle, J. AugmentedForearm: Exploring the design space of a display-enhanced forearm. In Proc. of AH '13 (2013), 9-12.

Rekimoto, J., and Saitoh, M. Augmented surfaces: A spatially continuous work space for hybrid computing environments. In Proc. of CHI '99 (1999), 378-385.

Ruiz, J., Li, Y., and Lank, E. User-defined motion gestures for mobile interaction. In Proc. of CHI '11 (2011), 197.

Siek, K. A., Rogers, Y., and Connelly, K. H. Fat finger worries: How older and younger users physically interact with PDAs. In Proc. of INTERACT '05, Springer Berlin Heidelberg (2005), 267-280.

Wobbrock, J. O., Morris, M. R., and Wilson, A. D. User-defined gestures for surface computing. In Proc. of CHI'09 (2009), 1083-1092.

Xiao, R., Laput, G., and Harrison, C. Expanding the input expressivity of smartwatches with mechanical pan, twist, tilt and click. In Proc. of CHI '14 (2014), 193-196.

Chen, X. "Anthony," Marquardt, N., Tang, A., Boring, S., & Greenberg, S. (2012). Extending a mobile device's interaction space through body-centric interaction. Proceedings of the 14th International Conference on Human-Computer Interaction with Mobile Devices and Services—MobileHCI '12, 151. doi:10.1145/2371574. 2371599.

Smith, R., Piekarski, W., & Wigley, G. (2005). Hand tracking for low powered mobile AR user interfaces. In proceedings of the Sixth Australasian conference on User interface-vol. 40. Retrieved from http://dl.acm.org/citation.cfm?id=1082245.

Wang, R. Y., & Popović, J. (2009). Real-time hand-tracking with a color glove. ACM SIGGRAPH 2009 Papers on—SIGGRAPH '09, 1. doi:10.1145/1576246.1531369.

Kirmani, Ahmed et al. "Exploiting Sparsity in Time-of-flight Range Acquisition Using a Single Time-resolved Sensor." Optics Express 19.22 (2011): 21485.

(56) References Cited

OTHER PUBLICATIONS

Colaço, A., Goyal, V.K., Kirmani, A., & Wong, F.N. (2012). CoDAC: A compressive depth acquisition camera framework. 2012 IEEE International Conference on Acoustics, Speech and Signal Processing (ICASSP), 5425-5428.

Albinsson, P., & Zhai, S. (2003). High precision touch screen interaction. CHI.

Balakrishnan, R., Forlines, C., Shen, C., & Wigdor, D.J. (2007). Direct-touch vs. mouse input for tabletop displays. CHI.

Bauer, M., Gemperle, F., Kasabach, C., Martin, R., & Stivoric, J. (1998). Design for Wearability. SEMWEB.

Butz, A., Garcia-Mendoza, A., Hilliges, O., Hodges, S., Izadi, S., & Wilson, A.D. (2009). Interactions in the air: adding further depth to interactive tabletops. UIST.

Fishkin, K.P., Gujar, A., Harrison, B.L., Mochon, C., & Want, R. (1998). Squeeze Me, Hold Me, Tilt Me! An Exploration of Manipulative User Interfaces. CHI.

Harrison, C., Morris, D., & Tan, D.S. (2011). Skinput: appropriating the skin as an interactive canvas. Commun. ACM, 54, 111-118.

Hinckley, K, & Sinclair, M. (1999). Touch-Sensing Input Devices. CHI.

Butler, A., Buxton, W., Hodges, S., Izadi, S., & Rrustemi, A. (2007). ThinSight: versatile multi-touch sensing for thin form-factor displays. UIST.

Baudisch, P., & Holz, C. (2010). The generalized perceived input point model and how to double touch accuracy by extracting fingerprints. CHI.

Buxton, W., Lee, S., & Smith, K.C. (1985). A multi-touch three dimensional touchsensitive tablet. CHI '85.

Miyaki, T., & Rekimoto, J. (2009). GraspZoom: zooming and scrolling control model for single-handed mobile interaction. Mobile HCI.

Bederson, B.B., Karlson, A.K., & Parhi, P. (2006). Target size study for one-handed thumb use on small touchscreen devices. Mobile HCI.

Maruyama, S., & Poupyrev, I. (2003). Tactile interfaces for small touch screens. UIST.

Huot, S., Lecolinet, E., & Roudaut, A. (2008). TapTap and MagStick: improving onehanded target acquisition on small touch-screens. AVI.

* cited by examiner

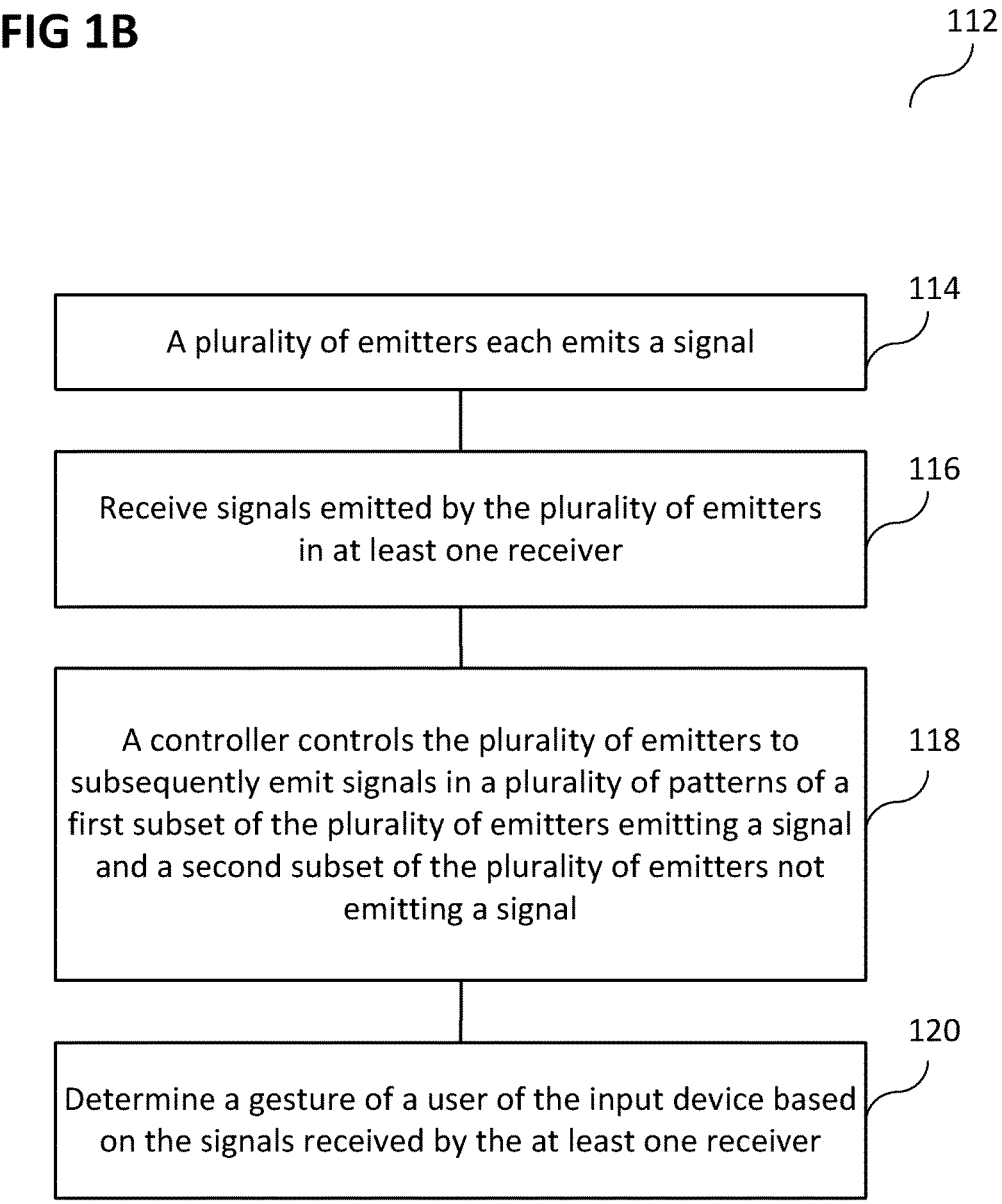

a) Static Pose b) Dynamic Pose c) Static Pose Path (Parallel, side view)

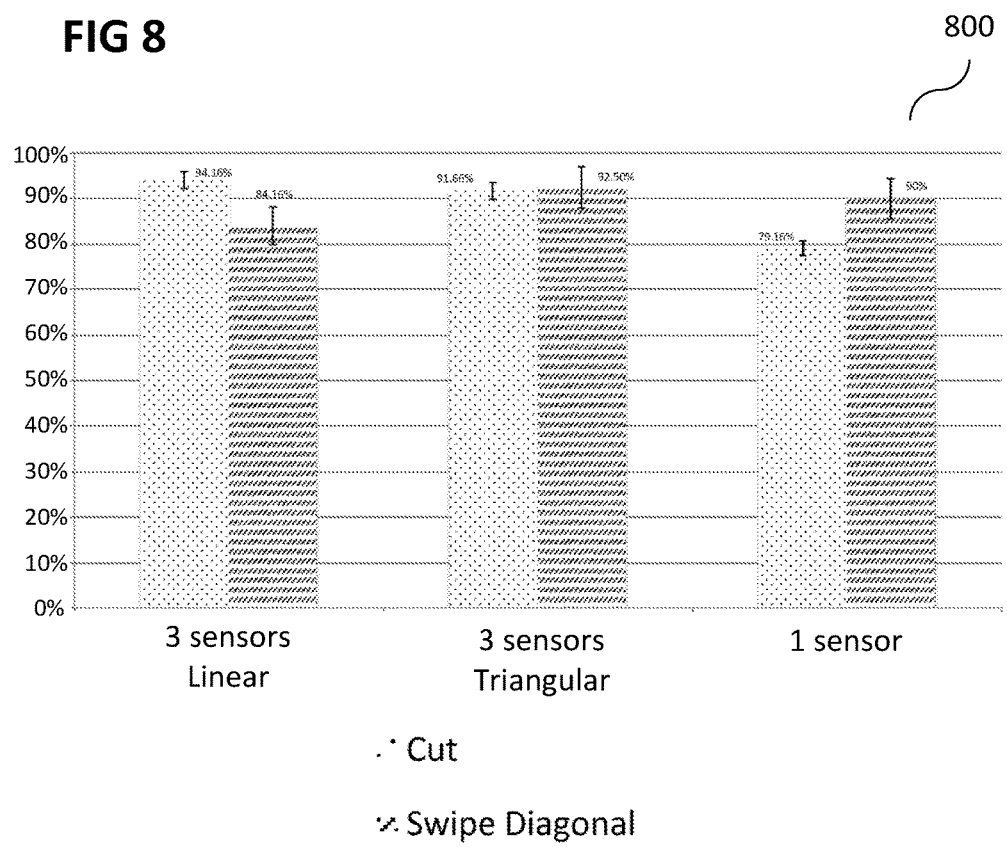
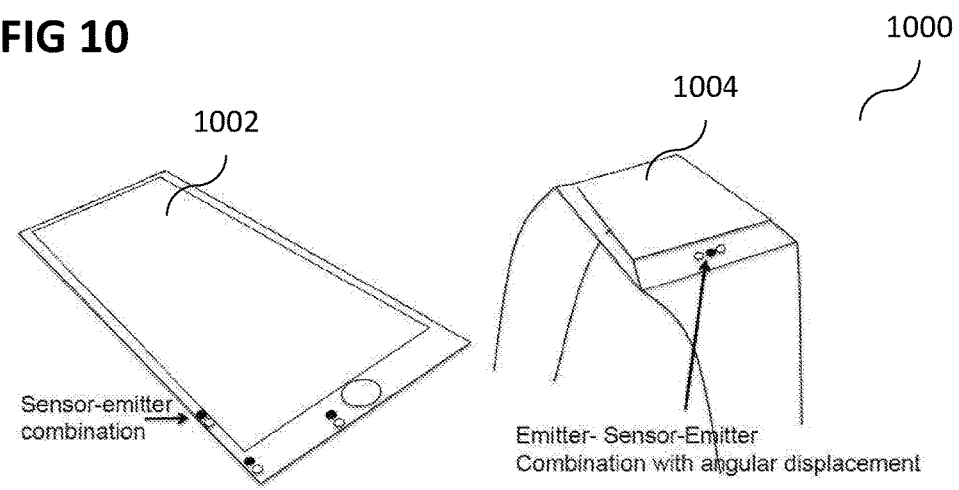

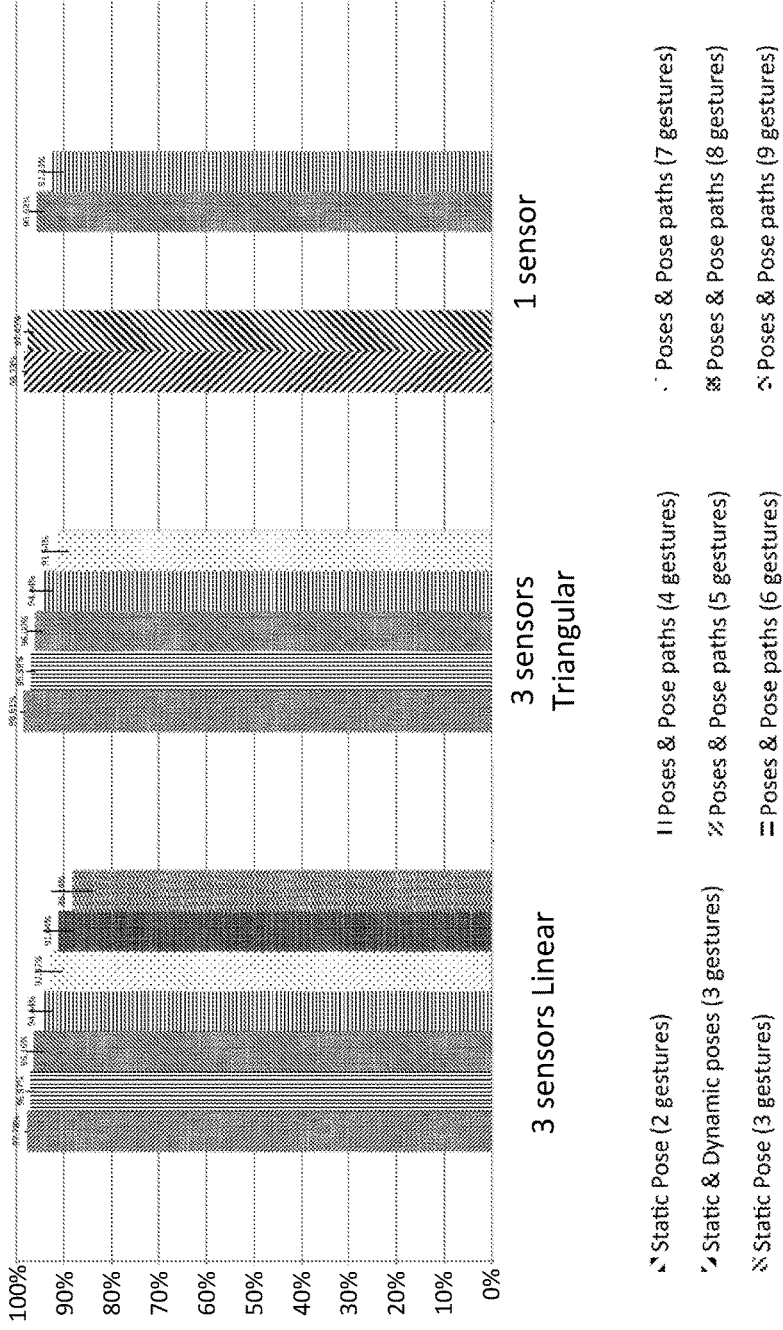

GESTURE RECOGNITION DEVICES, GESTURE RECOGNITION METHODS, AND COMPUTER READABLE MEDIA

CROSS-REFERENCE TO RELATED APPLICATIONS

The present application claims the benefit of the Singapore patent application No. 10201407991X filed on 1 Dec. 2014, the entire contents of which are incorporated herein by reference for all purposes.

TECHNICAL FIELD

Embodiments relate generally to gesture recognition devices, gesture recognition methods, and computer readable media.

BACKGROUND

Gesture recognition is evolving to an important component of user interfaces. As such, there may be a need for sophisticated gesture recognition methods.

SUMMARY

According to various embodiments, a gesture recognition device may be provided. The gesture recognition device may include: a plurality of emitters, each emitter configured to emit a signal; at least one receiver configured to receive signals emitted by the plurality of emitters; a controller configured to control the plurality of emitters to subsequently emit signals in a plurality of patterns of a first subset of the plurality of emitters emitting a signal and a second subset of the plurality of emitters not emitting a signal; and a gesture recognition circuit configured to determine a gesture of a user of the input device based on the signals received by the at least one receiver.

According to various embodiments, a gesture recognition method may be provided. The gesture recognition method may include: a plurality of emitters each emitting a signal; receiving signals emitted by the plurality of emitters in at least one receiver; a controller controlling the plurality of emitters to subsequently emit signals in a plurality of patterns of a first subset of the plurality of emitters emitting a signal and a second subset of the plurality of emitters not emitting a signal; and determining a gesture of a user of the input device based on the signals received by the at least one receiver.

According to various embodiments, a computer readable medium may be provided. The computer readable medium may include program instructions which when executed by a processor cause the processor to perform a gesture recognition method. The gesture recognition method may include: a plurality of emitters each emitting a signal; receiving signals emitted by the plurality of emitters in at least one receiver; a controller controlling the plurality of emitters to subsequently emit signals in a plurality of patterns of a first subset of the plurality of emitters emitting a signal and a second subset of the plurality of emitters not emitting a signal; and determining a gesture of a user of the input device based on the signals received by the at least one receiver.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 1B shows a flow diagram illustrating a gesture recognition method according to various embodiments;

FIG. 8 shows an illustration of cross configuration evaluation results according to various embodiments;

FIG. 9 shows an illustration of accuracy variation with gesture set size according to various embodiments; and FIG. 10 shows an illustration of two application scenarios where zSense can be easily integrated and extend the interaction space of a smartphone and/or a smart watch according to various embodiments.

DESCRIPTION

Embodiments described below in context of the devices are analogously valid for the respective methods, and vice versa. Furthermore, it will be understood that the embodiments described below may be combined, for example, a part of one embodiment may be combined with a part of another embodiment.

In this context, the gesture recognition device as described in this description may include a memory which is for example used in the processing carried out in the gesture recognition device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

Gesture recognition is evolving to an important component of user interfaces. According to various embodiments, sophisticated gesture recognition methods may be provided.

According to various embodiments, sensors and emitters (for example sensors and emitter pairs) may be provided which emit and sense an energy medium reflected by human body, for example, infrared or ultrasonic sensors and emitters, or for example light emitting diodes emitting light in the visible wavelength range and corresponding sensors.

zSense (in other words: the various devices and methods according to various embodiments) may use "non-linear spatial sampling" (this is where all the spatial patterns comes into action) to sense gestures.

According to various embodiments, zSense may provide a technique for close-proximity gesture recognition.

According to various embodiments, gesture based mobile computer-human interaction may be provided. The technology may implement compressive sensing based gesture recognition technology, with low energy consumption and low power consumption using non-linear spatial sampling.

Figure 1A:
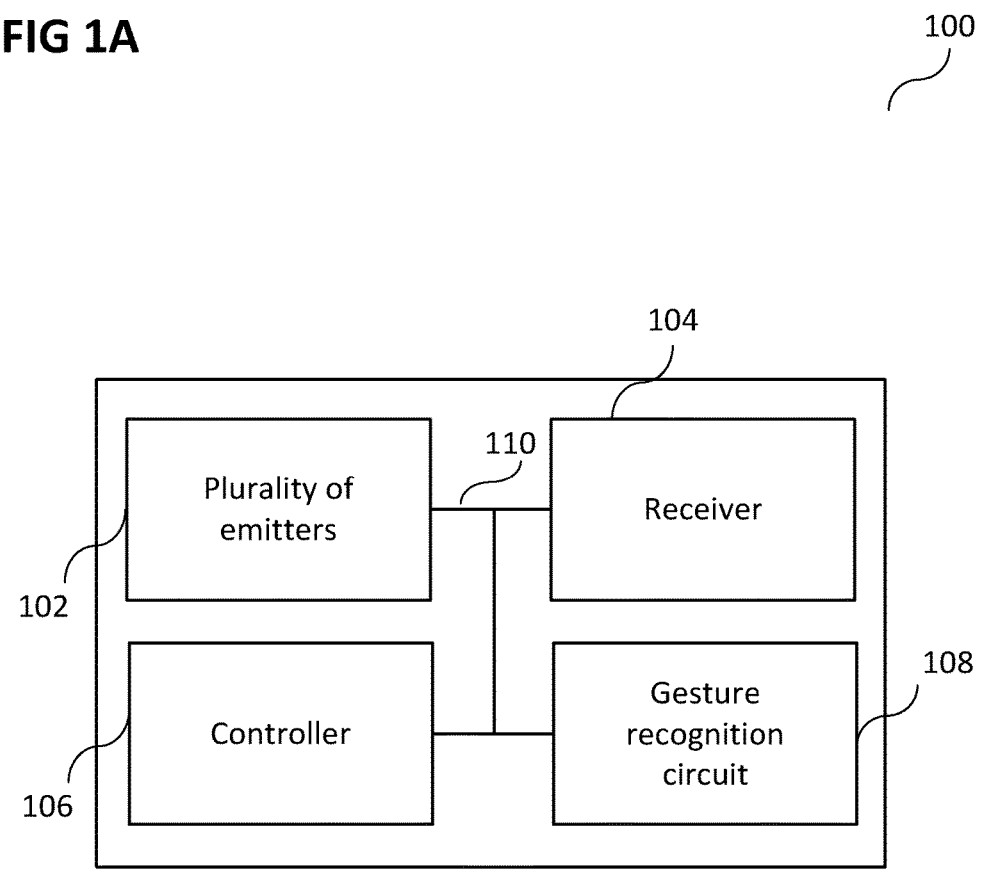
FIG. 1A shows a gesture recognition device according to various embodiments.

FIG. 1A shows a gesture recognition device 100 according to various embodiments. The gesture recognition device 100 may include a plurality of emitters 102. Each emitter may be configured to emit a signal. The gesture recognition device 100 may further include at least one receiver 104 configured to receive signals emitted by the plurality of emitters 102. The gesture recognition device 100 may further include a controller 106 configured to control the plurality of emitters 102 to subsequently emit signals in a plurality of patterns of a first subset of the plurality of emitters 102 emitting a signal and a second subset of the plurality of emitters 102 not emitting a signal. The gesture recognition device 100 may further include a gesture recognition circuit 108 configured to determine a gesture of a user of the input device 100 based on the signals received by the at least one receiver 104. The plurality of emitters 102, the at least one receiver 104, the controller 106, and the gesture recognition circuit 108 may be coupled with each other, like indicated by lines 110, for example electrically coupled, for example using a line or a cable, and/or mechanically coupled.

In other words, an input device according to various embodiments may determine a gesture of a user based on receiving signals emitted by a plurality of emitters in a pattern of some of the emitters of the plurality of emitters transmitting signals and other emitters of the plurality of emitters not transmitting signals.

According to various embodiments, the at least one receiver 104 may be configured to receive signals emitted by the plurality of emitters 102 and reflected from a target (not shown in FIG. 1A).

According to various embodiments, the plurality of emitters 102 may be provided in a plane.

According to various embodiments, the gesture recognition device 100 may include a plurality of receivers 104 provided in a plane.

According to various embodiments, the plurality of emitters 102 may be provided on a line.

According to various embodiments, the plurality of emitters 102 may be provided in a triangular shape.

According to various embodiments, the plurality of emitters 102 may be provided in an L-shape.

According to various embodiments, the plurality of emitters 102 may be provided facing a common direction.

According to various embodiments, the plurality of emitters 102 may be are provided facing a pairwise angularly displaced direction.

According to various embodiments, the plurality of emitters 102 may include or may be or may be included in a plurality of infrared emitters or a plurality of ultrasonic sensors.

According to various embodiments, each infrared emitter may be configured to emit infrared light.

According to various embodiments, the at least one receiver 102 may include or may be or may be included in a plurality of receivers, each receiver configured to receive signals emitted by the plurality of emitters.

According to various embodiments, each receiver may be configured to receive infrared light.

According to various embodiments, each receiver may be configured to provide an electrical signal based on the signals received from the plurality of transmitters.

According to various embodiments, the controller 106 may be configured to periodically repeat the plurality of patterns.

According to various embodiments, the first subset may vary in the plurality of patterns.

According to various embodiments, the second subset may vary in the plurality of patterns.

According to various embodiments, in each pattern, a set union of the first subset and the second subset may include or may be or may be included in the plurality of emitters.

According to various embodiments, in each pattern, a cut-set of the first subset and the second subset may be empty.

According to various embodiments, the gesture recognition circuit 108 may be configured to classify gestures of a user into a plurality of classes.

According to various embodiments, the gesture recognition circuit 108 may be configured to classify the gestures based on at least one support vector machine.

According to various embodiments, the gesture recognition circuit 108 may be configured to identify a location of a finger of the user based on a support vector machine.

According to various embodiments, the gesture recognition circuit 108 may be configured to identify a horizontal position of a finger of the user based on a first support vector machine.

According to various embodiments, the gesture recognition circuit 108 may be configured to identify a vertical position of the finger of the user based on a second support vector machine.

According to various embodiments, the gesture recognition circuit 108 may be configured to classify the gestures based on a K-star method.

According to various embodiments, the gesture recognition circuit 108 may be configured to classify the gestures based on a BayesNet method.

According to various embodiments, the gesture recognition device 100 may further include a training circuit (not shown in FIG. 1A) configured to train the gesture recognition circuit.

According to various embodiments, the training circuit may be configured to train the gesture recognition circuit 108 based on signals which are received for known gestures of the user.

According to various embodiments, the training circuit may be configured to train the gesture recognition circuit 108 based on an optimization method.

FIG. 1B shows a flow diagram 112 illustrating a gesture recognition method according to various embodiments. In 114, a plurality of emitters each may emit a signal. In 116, signals emitted by the plurality of emitters may be received in at least one receiver. In 118, a controller may control the plurality of emitters to subsequently emit signals in a plurality of patterns of a first subset of the plurality of emitters emitting a signal and a second subset of the plurality of emitters not emitting a signal. In 120, a gesture of a user of the input device may be determined based on the signals received by the at least one receiver.

According to various embodiments, the gesture recognition method may further include receiving in the at least one receiver signals emitted by the plurality of emitters and reflected from a target.

According to various embodiments, the plurality of emitters may be provided in a plane.

According to various embodiments, signals emitted by the plurality of emitters may be received in a plurality of receivers provided in a plane.

According to various embodiments, the plurality of emitters may be provided on a line.

According to various embodiments, the plurality of emitters may be provided in a triangular shape.

According to various embodiments, the plurality of emitters may be provided in an L-shape.

According to various embodiments, the plurality of emitters may be provided facing a common direction.

According to various embodiments, the plurality of emitters may be provided facing a pairwise angularly displaced direction.

According to various embodiments, the plurality of emitters may include or may be or may be included in a plurality of infrared emitters or a plurality of ultrasonic sensors.

According to various embodiments, each infrared emitter may emit infrared light.

According to various embodiments, the at least one receiver may include or may be or may be included in a plurality of receivers, each receiver receiving signals emitted by the plurality of emitters.

According to various embodiments, each receiver may receive infrared light.

According to various embodiments, each receiver may provide an electrical signal based on the signals received from the plurality of transmitters.

According to various embodiments, the controller may periodically repeat the plurality of patterns.

According to various embodiments, the first subset may vary in the plurality of patterns.

According to various embodiments, the second subset may vary in the plurality of patterns.

According to various embodiments, in each pattern, a set union of the first subset and the second subset may include or may be or may be included in the plurality of emitters.

According to various embodiments, in each pattern, a cut-set of the first subset and the second subset may be empty.

According to various embodiments, the gesture recognition method may further include classifying gestures of a user into a plurality of classes.

According to various embodiments, the gesture recognition method may further include classifying the gestures based on at least one support vector machine.

According to various embodiments, the gesture recognition method may further include identifying a location of a finger of the user based on a support vector machine.

According to various embodiments, the gesture recognition method may further include identifying a horizontal position of a finger of the user based on a first support vector machine.

According to various embodiments, the gesture recognition method may further include identifying a vertical position of the finger of the user based on a second support vector machine.

According to various embodiments, the gesture recognition method may further include classifying the gestures based on a K-star method.

According to various embodiments, the gesture recognition method may further include classifying the gestures based on a BayesNet method.

According to various embodiments, the gesture recognition method may further include training the gesture recognition circuit.

According to various embodiments, the gesture recognition method may further include training the gesture recognition circuit based on signals which are received for known gestures of the user.

According to various embodiments, the gesture recognition method may further include training the gesture recognition circuit based on an optimization method.

According to various embodiments, a computer readable medium may be provided and may include program instructions which when executed by a processor cause the processor to perform a gesture recognition method, for example the gesture recognition method described with reference to FIG. 1B.

According to various embodiments (which may be referred to as zSense), devices and methods may be provided which are capable of recognizing in-air close-proximity gestures (shallow depth gestures) enabling extended interaction space for portable smart mobile devices. zSense may use non-linear spatial sampling (NSS), a technique derived from the principle of compressive sensing. Different ways to combine minimum number of non-focused IR (Infrared) sensors and IREDs (Infrared Emitting Diodes) may be provided to achieve non-linear sampling using spatial light modulation (SLM). A number of sensor-emitter combinations and their spatial arrangement may contribute to generate higher number of partially orthogonal readings from a set of a reduced number of sensors. Gesture recognition systems may be provided ranging from as low as single sensor to three sensors, or even more sensors.

Various embodiments may provide high spatial efficiency: Various embodiments may work with minimal numbers of sensors/emitters in close spans. As such, sensitive space relative to the space required by the sensors/emitters may be larger.

Various embodiments may provide low processing power: Due to compressive sensing principle and the use of a fewer sensors, zSense may require low signal processing power.

Various embodiments may provide low energy consumption: Systems according to various embodiments may consume very low energy due to time-multiplexed iterative activation (NSS) and the use of a fewer emitters.

Various embodiments may provide low cost: Systems according to various embodiments may have been designed using low-cost off-the-shelf components.

According to various embodiments, a non-linear spatial sampling approach may be introduced for gesture recognition. According to various embodiments, a theoretical framework for zSense sensor module may be provided. According to various embodiments, a zSense sensor module may be provided and its performance may be validated through experiments. According to various embodiments, various spatial arrangements of zSense sensor modules and identifiable gestures may be investigated. According to various embodiments, zSense-enabled proof-of-concept applications may be provided.

According to various embodiments, zSense may implement a gesture recognition system into devices with smaller form factors, low power and low signal processing capabilities. As such, zSense may be suitable for enabling gesture-based interactions on smaller devices (e.g. smart watches), wearable devices and other type of small-scale personal digital devices.

According to various embodiments, zSense may utilize the compressive sensing concept to sense shallow depth finger-based gestures in an energy and space efficient manner. This may hold great importance for mobile applications since they are required to operate under low power and low processing capability. Most of the camera based (either 2D or depth cameras) recognition methods require higher processing capabilities and consume a lot of energy to illuminate the sensitive area. However, out of the huge set of data collected through such a system, only a small fraction may be necessary to detect the gestures. On a mobile device, it may be more desirable to perform finger gestures, which spans in small area, than gestures such as hand waving etc. that requires larger spatial span. According to various embodiments, a camera based approach may be used to identify such small gestures results in both unnecessary data collection and processing. This may be due to the spatial sparse nature of gesture data.

Figure 2:
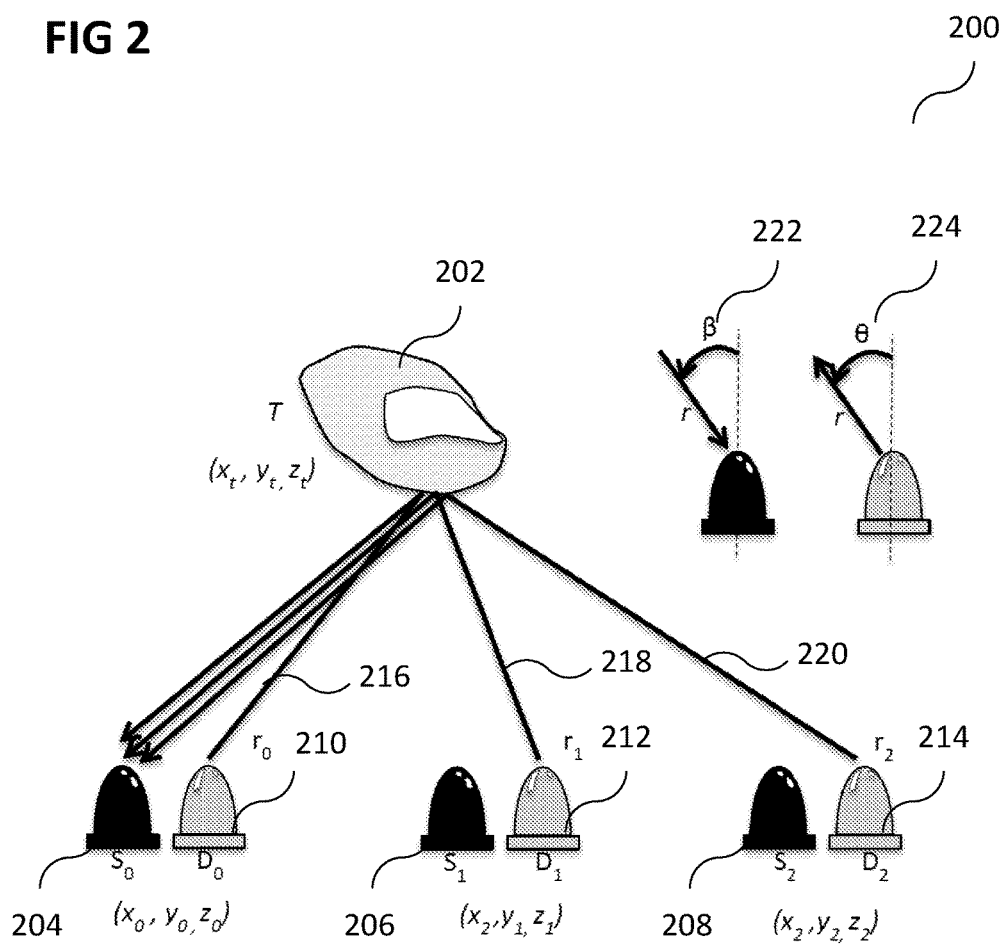
FIG. 2 shows an illustration of an example constellation of three receivers and three transmitters, and the respective rays emitted by each of the emitters according to various embodiments.

FIG. 2 shows an illustration 200 of an example constellation of three receivers (for example sensors ($S_{0,1,2}$) 204, 206, 208) and three emitters (for example IREDs ($D_{0,1,2}$) 210, 212, 214) and the respective rays ($r_{0,1,2}$) 216, 218, 220 emitted by each of the IREDs 210, 212, 214 according to various embodiments.

According to various embodiments, the mathematical model for the given configuration may be derived and compared them with practical values. Like shown in FIG. 2, in an exemplary reference configuration of three IR emitting diodes ($D_{0,1,2}$) 210, 212, 214 and three photo diodes ($S_{0,1,2}$) 204, 206, 206, and respective IR rays 216, 218, 220 emitted by IREDs ($r_{0,1,2}$) 210, 212, 214, receiving at the sensor 206 (S0), reflected from a target T 202 (for example a finger of a user). For the ease of calculations, it may be assumed that the system is provided in a plane, so that it can be assumed that all the y locations of $D_{0,1,2}$, $S_{0,1,2}$ and T are 0. Furthermore, if we arrange the $D_0$ and $S_0$ to lie along the same y axis, with same x coordinates ($x_0$), distance between $D_0$ and $S_0$ is going to be canceled by the symmetry along y=0 plane. Therefore, locations of D, S and T may be expressed using (x, z) coordinates alone.

In the following, a received intensity model according to various embodiments will be described.

The received intensity at sensor $S_i$ due to the light emitted from $D_j$ and reflected from target T may be calculated. According to various embodiments, identical sensors and emitters may be used for all the i and j values, and thus, relative radiant intensity pattern of emitter D may be denoted to be $I_d(\theta)$, where $\theta$ is the angular displacement from the normal direction to exiting angle of the ray r. Similarly, directionality of the sensor S can be expressed by $G_s(\beta)$ where $\beta$ is the angular displacement from the normal direction to incident angle of the ray r, like shown in illustrations 222 and 224 of FIG. 2.

Using inverse-square law, a function for received intensity at a given sensor $S_i$ by a target T at ($x_t$, $z_t$) from a given emitter $D_j$, $f_{i,j}(x_t, z_t)$ may be derived as follows:

$$f_{i,j}(x_t, z_t) = \frac{I_d(\theta(t, j))I_s(\beta(t, i))}{16\pi^2(\|TD_j\|^2\|TS_k\|^2)} \quad (1)$$

where $\theta(t,j)$ may be the angle from the normal direction of the emitter Dj towards the direction of target T (i.e.

$$(t, j) = \tan^{-1}\frac{(x_t - x_j)}{(z_t - z_j)},$$

similarly, $\beta(t,j)$ is the angle towards the target T from sensor $S_i$, and $\|\cdot\|$ represents Euclidean distance between two points in space. In this case, the target may be assumed to be radiating isotropically, and the Lambert's cosine coefficient may be ignored due to radial fall-off.

According to various embodiments, an off the shelf IRED, Optek technologies OP293, with emission angle of half power at +30° may be used. Sensor used is Osram SFH203FA[2] half sensitivity angle ±20°. The approximate normalized $I_d(\theta)$ and $G_s(\beta)$ may be derived for emitter and sensor respectively, so that they fit to the graph given in the component data sheets:

$$I_d(\theta) = \frac{1}{9\sqrt{2\pi}} e^{\frac{-\theta^2}{162}} \text{ and} \quad (2)$$

$$G_s(\beta) = \frac{1}{1 + \left|\frac{\beta}{20}\right|^3} \quad (3)$$

Combining equation 1 along with equation 2 and 3, the relative intensity received by any sensor, reflected from a given target location, sourced from a given emitter may be calculated.

In the following, a spatial light modulator (SLM) according to various embodiments will be described.

In general, in imaging or computer vision applications, the interested area may be well lit, equally illuminated and equally sampled, so that each region (depends on resolution) may have corresponding pixel measurements. For example when integrating a mobile device with 10 IREDs along with 10 IR photo-diodes, each 10 mm spaced, this may provide a case of equally sampled 10 cm distance with sensor-emitter density of 1 cm-1 making linear measurements. According to various embodiments, the sensor density may be reduced significantly using nonlinear measurement tactics. Spatial light modulation may be changing the spatial intensity of illumination according to the control signal. SLM may be achieved through either modulating the light source or the incident light at the sensor.

Let's consider a case where there are m number of emitters, $D_j$ for j=0,1,2, m−1 and n number of sensors, $S_i$ for i=0, 1, 2, n−1. For m emitters, p number of different on-off patterns are possible where p≤2m−1. These patterns can be represented in a p×m matrix A.

$$\Lambda = \begin{bmatrix} \lambda_{0,0} & \lambda_{0,1} & \cdots & \lambda_{0,m-1} \\ \lambda_{1,0} & \lambda_{1,1} & \cdots & \lambda_{1,m-1} \\ \vdots & \vdots & \ddots & \vdots \\ \lambda_{p-1,0} & \Lambda_{p-1,1} & \cdots & \lambda_{p-1,m-1} \end{bmatrix} \quad (4)$$

From equation 1, for each sensor-emitter combination, a received power intensity matrix with m×n dimensions F may be constructed:

$$F = \begin{bmatrix} f_{0,0} & f_{0,1} & \cdots & f_{0,n-1} \\ f_{1,0} & f_{1,1} & \cdots & f_{1,n-1} \\ \vdots & \vdots & \ddots & \vdots \\ f_{m-1,0} & f_{m-1,1} & \cdots & f_{m-1,n-1} \end{bmatrix} \quad (5)$$

$f_{j,i}(x, z)$ may represent the power intensity received by $i^{th}$ sensor due to the illumination by $j^{th}$ emitter reflected due to a target at any (x, z) coordinates.

Since the pattern matrix A and sensor-emitter cross power matrix F are calculated, now the measured variable matrix A, with dimensions and different variables p×n, may be obtained:

$$A = \Lambda \times F \quad (6)$$

Therefore, A contains a linear integration of different ray components emitted by different emitters. Any member of A, $\alpha_{k,l}$ may be expressed as:

$$\alpha_{q,r}(x, z) = \sum_{j=0}^{j=m-1} \lambda_{q,j} f_{j,r}(x, z) \quad (7)$$

In equation 7, $\alpha_{q,r}$ (x, z) represents the power received by $r^{th}$ sensor when $q^{th}$ IRED pattern is active, and the target location is (x, z).

In the following, a comparison with practical values will be described.

This model may be used to model and visualize given sensor-emitter configuration and verify the design choices, such as space between sensors, and number of sensors.

In order to demonstrate the theoretical model and its practical significance, the configuration shown in FIG. 2 may be considered. There are three sensors available, making n=3. IREDs $D_i$ for i=0, 1, 2 can create 23-1 resulting total of 7 patterns (i.e. p=7). If all these patterns are considered, the measurement matrix A may be 7×3, resulting 21 total measurements per given (x, z) coordinates of the target. Furthermore, equations 2 and 3 may be used to generate an approximate model for the real life setup. Let's take the pattern matrix $\Lambda_c$ for this case as follows, $$\Lambda_c = \begin{bmatrix} 1 & 0 & 0 \\ 0 & 1 & 0 \\ 1 & 1 & 0 \\ 0 & 0 & 1 \\ \vdots & \vdots & \vdots \\ 1 & 1 & 1 \end{bmatrix} \quad (8)$$

Using $\Lambda_c$, F (equation 5) and emitter and sensor profile given in equations 2 and 3 respectively, the resulting measurement matrix Ac may be calculated for a given target location. After adjusting parameters, spacing between sensor and emitter units (sensor and emitter are coupled to same location in the interested axis) along x axis may be selected to be 25 mm and, keeping a target height at 50 mm (i.e. zt=50 mm) and the twenty one $\alpha_{q,r}$ values may be both measured theoretically using the model and empirically using a physical setup. In practical measurements, the configuration shown in FIG. 2 may be implemented and measured, and measurements for a target moving along x axis, in 5 mm steps, at each step, may be collected. 100 measures may be averaged per location, to get the final measurement.

Figure 3:
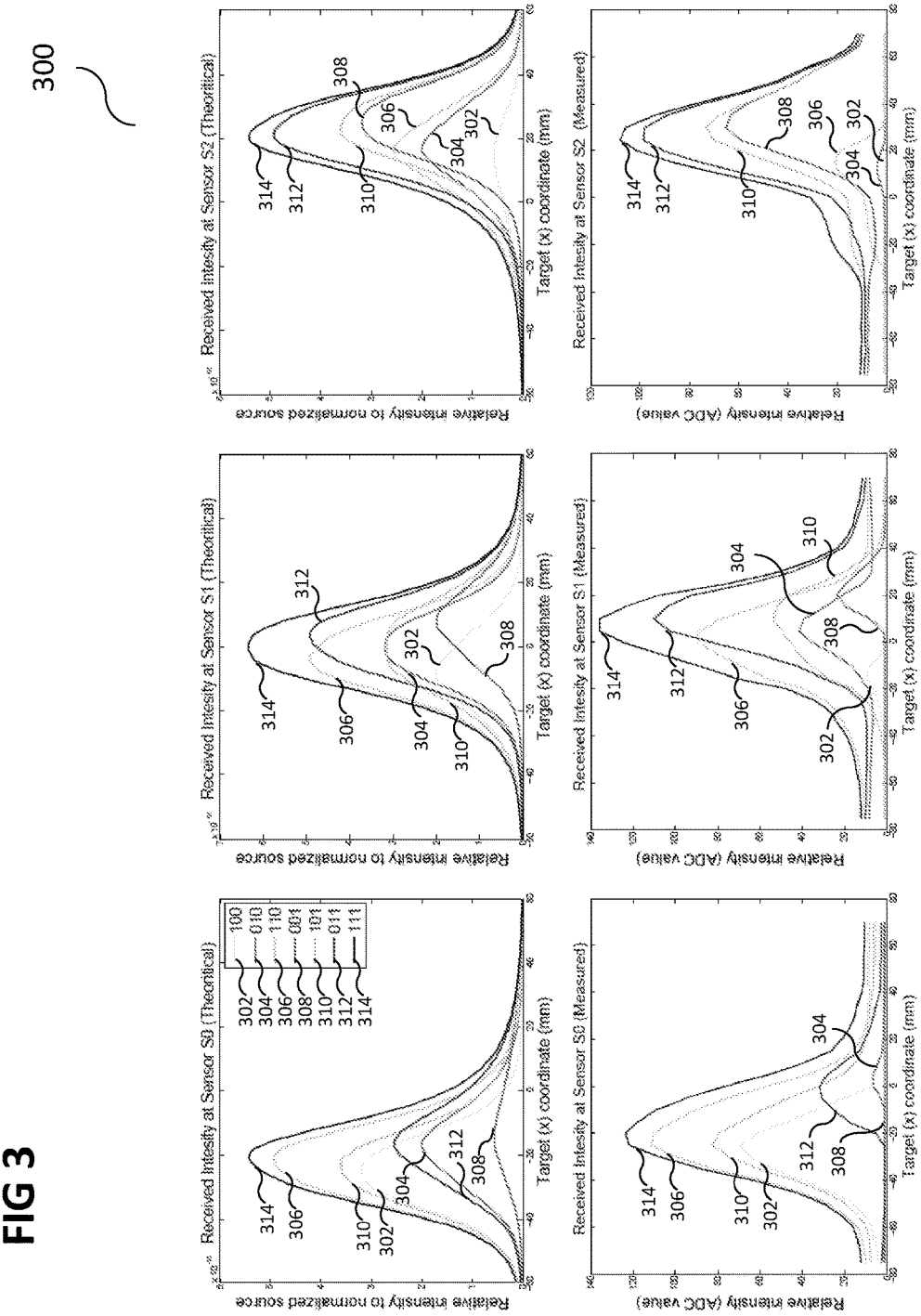
FIG. 3 shows an illustration of measurements, with a measured variable matrix A according to various embodiments.

FIG. 3 shows an illustration 300 of measurements, with a measured variable matrix A according to various embodiments. for configuration like shown in FIG. 2, shown separately for each sensor (column by column). Top row shows calculated profiles considering emitters as three normalized sources. Sensor-emitter units are spaced 25 mm apart along x axis, and S1 aligned along x=0. Bottom row shows measured intensity (ADC value) from three actual sources with same configuration and conditions. Throughout FIG. 3, lines 302 refer to "100", lines 304 refer to "010", lines 306 refer to "110", lines 308 refer to "001", lines 310 refer to "101", lines 312 refer to "011", and lines 314 refer to "111", wherein the first digit refers to the first emitter, the second digit refers to the second emitter, and the third digit refers to the third emitter, and "0" refers to "not emitting", and "1" refers to "emitting". For example, "111" refers to all emitters emitting; for example "010" refers to only the second emitter emitting.

In other words, FIG. 3 shows both theoretically calculated (top row) and measured values (bottom row, separately for each sensor (columns), showing significantly similar variations as expected. In real data, an unbalance can be seen in the sensor profiles. This may be due to, unlike the theoretical calculations; system could have minor impurities, in physical setup, sensors (i.e. all the sensors could not be identical) and IRED manufacturing along with the electronics.

FIG. 3 shows how columns of Ac (i. e. each curves in graph) get converged with x axis displacement of the target. When the curves get converged, identifying location gets difficult. Therefore, this mathematical model can be used as a design tool to estimate the parameters for different spatial configurations, such as to calculate appropriate distances between sensor-emitter units. Designers can select between different combinations of sensors according to the application requirements. In FIG. 3, one can observe that once target displacement exceeds 25 mm, curves get extremely converged. This is span depends on the sensor directionality Gs and emitter relative radiant pattern Id. Therefore, this model is helpful to design the gesture sensitive area, according to once choice of sensors and emitters. Since we used the same sensor-emitter pair for out prototype, we chose 25 mm to be the ideal sensor-emitter unit displacement after exploring different distances from calculated profiles.

In this analysis, we only considered the linear arrangements of the sensors and emitters, however, concept still hold true for two dimensional arrangements and angular arrangements of sensors and emitters to create SLM.

In the following, a hardware implementation according to various embodiments will be described.

Figure 4:
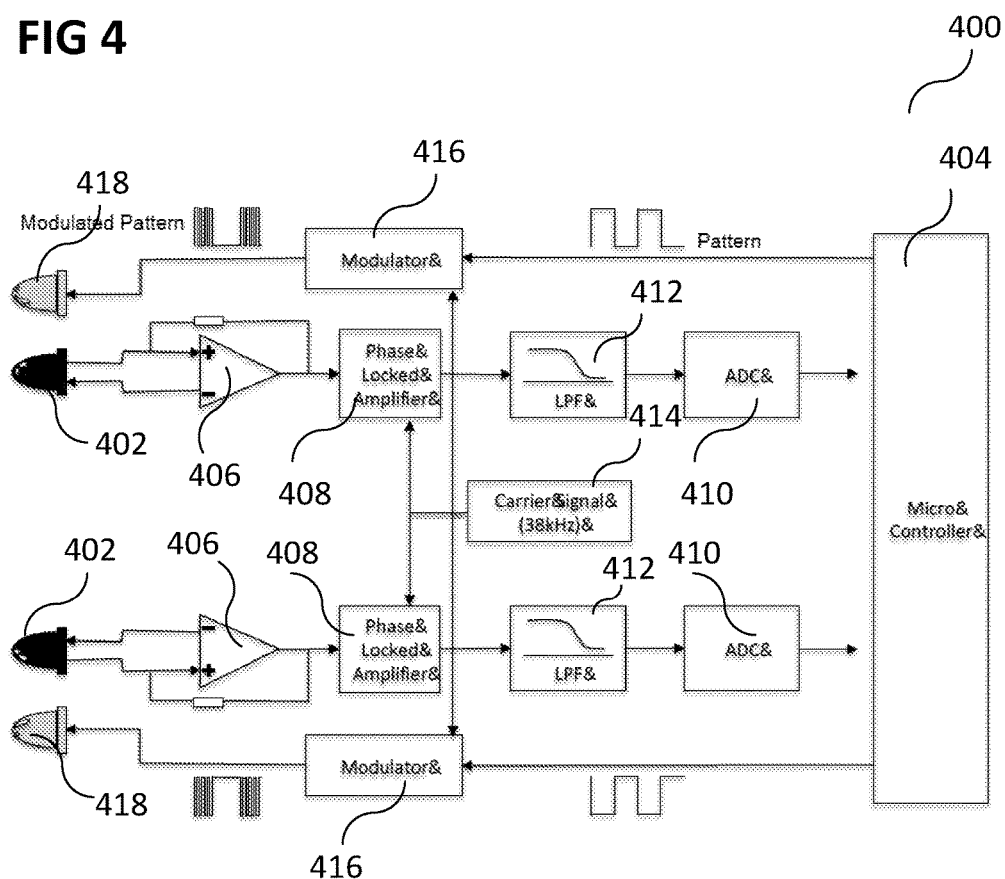
FIG. 4 shows a prototype hardware block diagram, and shows the block diagram of the zSense's electronics unit according to various embodiments.

FIG. 4 shows a prototype hardware block diagram 400, and shows the block diagram of the zSense's electronics unit according to various embodiments. Emitters 418 (for example IREDs) may be provided with a modulated pattern from a modulator 416. Receivers 402 (for example sensors) may be driven using a commonly available Arduino Pro Mini (16 Mhz, 5V) microprocessor 404 to create the SLM, and the pattern may be modulated at 38 kHz (for example generated by an oscillator 414) to reduce noise at sensing stage. IR photo-diode input may be first amplified using current to voltage converting amplifier stage, using a simple operational amplifier (ST TL074 op-amp) 406 and again amplified using a phase lock amplifying usage (using TL074 again) 408 to reduce background noise. This may significantly reduce noise from external sources (such as florescent lights). Experiments were carried directly under a florescent light sources, and effect was minimum. The system has been tested in- and outdoors and performances only reduced when directly exposed to sun. Microchip MCP3204, a 4-channel analog to digital converter 410 may be used to convert the amplified signal (after passing through a low pass filter 412) to digital, and the amplified signal may be transmitted to the computer via micro controller 404 for classification stage.

Sensor data may be acquired at 12 k samples per second. Therefore, the SLM function may also operate at 12 kHz. For each measurement set, 24 data points may be acquired (including all off conditions) and averaged 20 times to reduce noise and transmitted to host computer at 25 data sets per second. Therefore, actual throughput for the computer is at 25 Hz.

It will be understood that various components may be provided separately for each set of IRED and sensor, and that various components may be provided for joint use with a plurality of IREDs and sensors. Furthermore, it will be understood that FIG. 4 shows two IREDs and two sensors, but any number of IREDs and sensors may be provided, and the number of IREDs may be different from the number of sensors.

Figure 5:
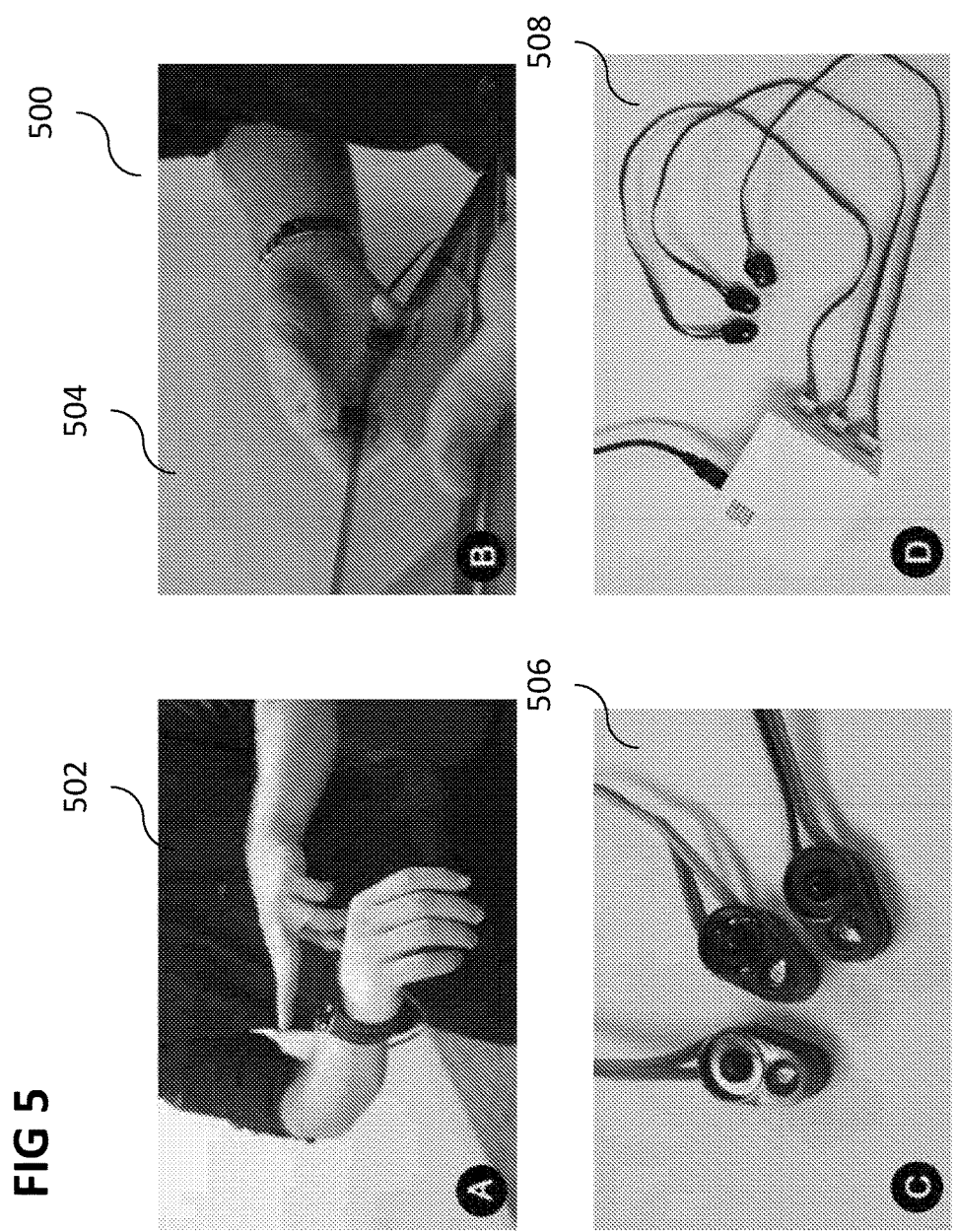
FIG. 5 shows an illustration of an implemented prototype with interaction instances according to various embodiments.

FIG. 5 shows an illustration 500 of an implemented prototype with interaction instances according to various embodiments. 502 illustrates using shallow depth on a smart watch. 504 illustrates attaching sensors on a touch device. 506 illustrates three sensor-emitter modules. 508 illustrates modules with a controller.

In the following, a software implementation according to various embodiments will be described.

For classification, two Support Vector Machines (SVMs) and K-star algorithm may be employed. Initially, a single SVM was used to identify the finger location. Then, it was observed that identifying horizontal finger position and vertical finger position separately provided better results. Therefore, two SVMs were used to identify horizontal and vertical finger positions. Both SVMs had the following properties: Sequential Minimal Optimization, C=1.0, exponent=2.0.

Each dataset from the sensor is represented by a 21, 8 and 3 point vectors for 3 sensor 3 IRED, 2 sensor 2 IRED and 1 sensor 2 IRED configurations respectively. Furthermore, the derivatives of these points were inserted before a series of features was extracted for classification. Insertion of derivatives increased the accuracy of the classifiers.

After identifying the finger location, a K-star classifier was used to recognize different gestures. It was evident that using K-star classifier produced significantly better results than using another SVM classifier. K-star classifier properties are entropicAutoBlend=false, globalBlend=20.

Once these classifiers are trained, gesture classification may proceed in a real time fashion.

In the following, experiments and results will be described.

Figure 6:
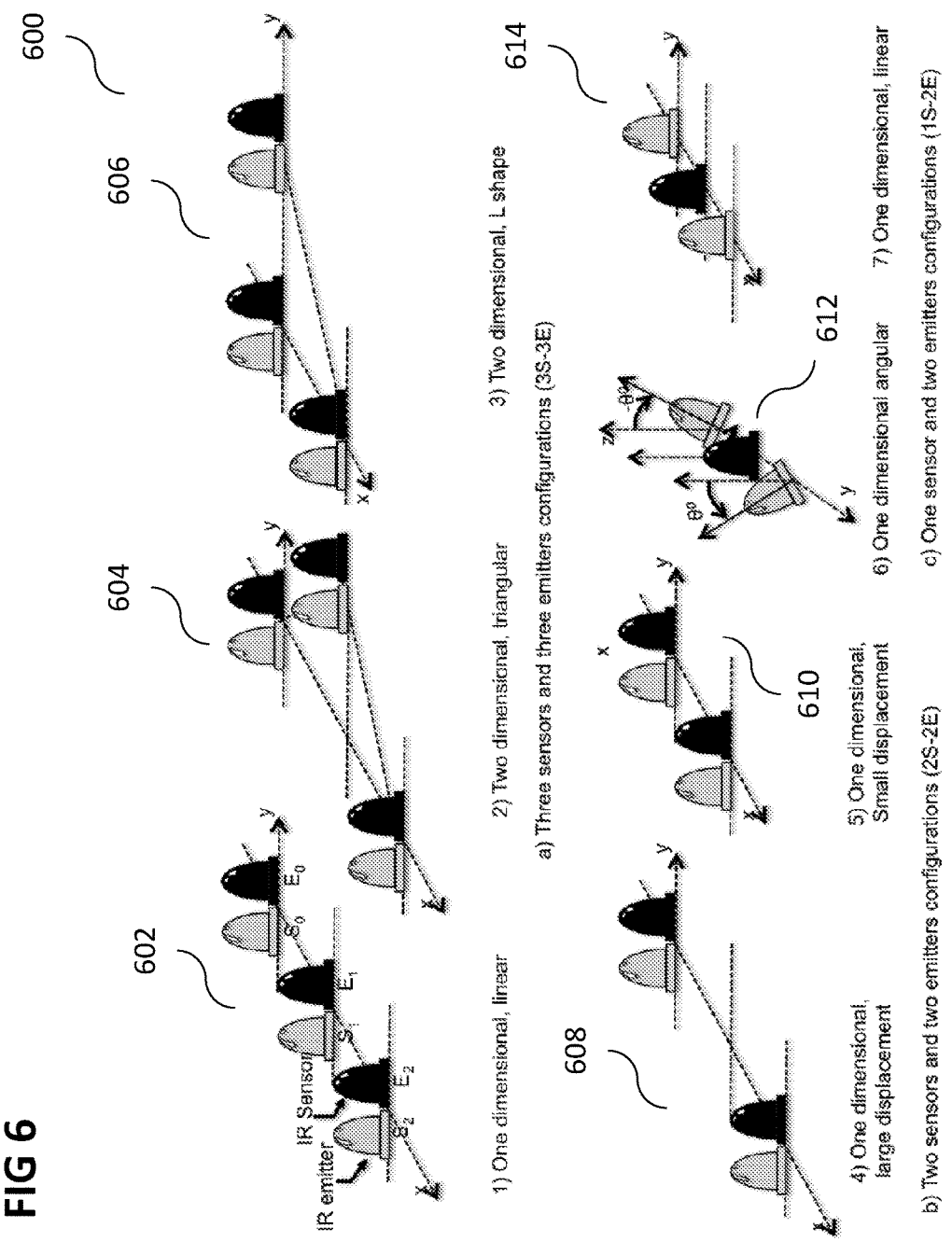
FIG. 6 shows an illustration of sensor constellations possible with number of sensors or emitters limited to 3 according to various embodiments.

FIG. 6 shows an illustration 600 of sensor constellations possible with number of sensors or emitters limited to 3 according to various embodiments. It will be understood that emitters are shown in white, and sensors are shown in black in FIG. 6. 602 shows a one dimensional linear arrangement. 604 shows a two dimensional triangular arrangement. 606 shows a two-dimensional L shape arrangement. The arrangements of 602, 604, and 606 each include three sensors and three emitters, and thus may be referred to as 3S-3E configurations.

608 shows a one dimensional large displacement arrangement. 610 shows a one dimensional small displacement arrangements. The arrangements of 608 and 610 each include two sensors and two emitters, and thus may be referred to as 2S-2E configurations.

612 shows a on dimensional angular arrangement, and 614 shows a one dimensional linear arrangement. The arrangements of 612 and 614 each include one sensor and two emitters, and thus may be referred to as 1S-2E configurations.

FIG. 7A to FIG. 7D show illustrations of various gestures according to various embodiments.

Figure 7A:
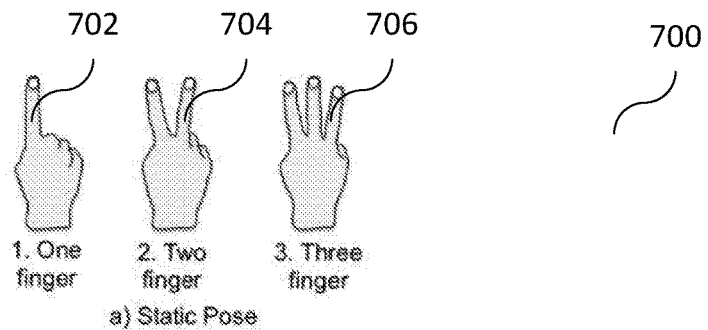
FIG. 7A to FIG. 7D show illustrations of various gestures according to various embodiment.

FIG. 7A shows an illustration 700 of three static poses (a pose 702 showing one finger, a pose 704 showing two fingers, and a pose 706 showing three fingers).

Figure 7B:
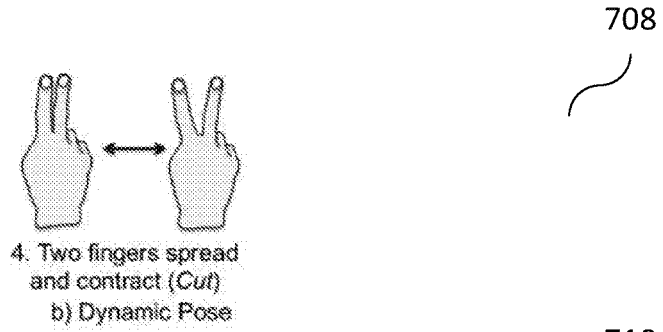

FIG. 7B shows an illustration 708 of a dynamic pose (for example two fingers spreading and contracting (for example a cut gesture)).

Figure 7C:
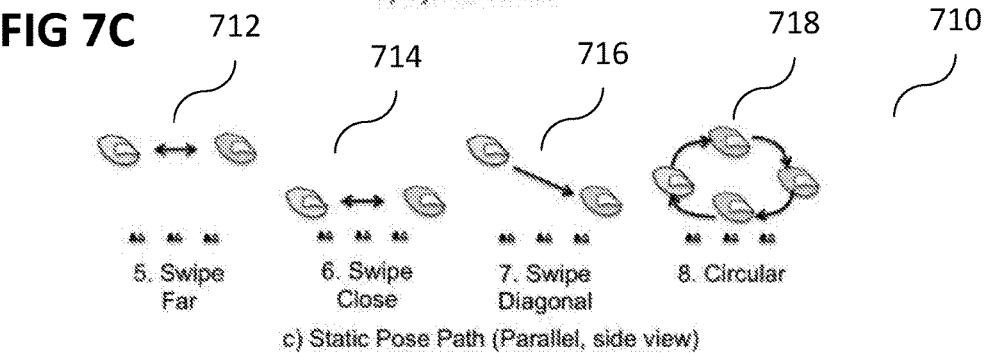

FIG. 7C shows an illustration 710 of four basic static pose paths, for example in a parallel, side view (for example a path 712 of swiping far, a path 714 of swiping close, path 716 of swiping diagonal, and a circular path 718).

Figure 7D:
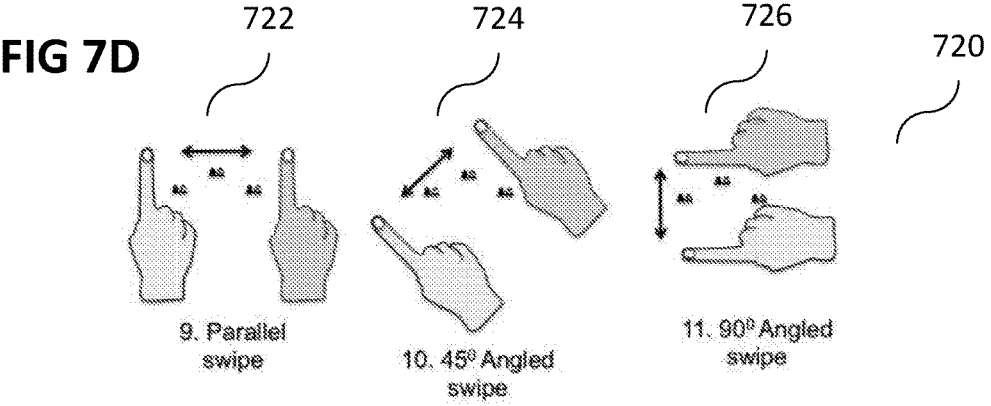

FIG. 7D shows an illustration 720 of three angular variations (a parallel swipe 722, a 45° angled swipe 724, and a 90° angled swipe 726) in the direction of static pose paths.

Furthermore, according to various embodiments, for the four static pose paths, mirrored gestures may be considered.

A series of studies was conducted in order to form clear opinions about the variety of applications enabled by the zSense, feasibility of zSense and the performance of the classification methodology.

Methods according to various embodiments were evaluated to understand the accuracy of gestures recognized depending on the number of sensors used and the spatial configurations used. Furthermore, another goal of the study was to mix and match different gestures to different configurations, so that, in future, designers can use the findings of this paper as a key to create gesture interfaces using zSense.

A pilot study was conducted using 3 participants in order to identify a suitable set of configurations and gestures for an extensive user study. It was compulsory to eliminate trivial cases due to high number of conditions (configurations× number of sensors), which will increase the time taken per user. Based on the performance of the pilot study, few trivial gestures and configurations were removed from the user study. For the pilot study, all 7 configurations as shown in FIG. 6 have been evaluated for all the gestures shown in the FIG. 7, resulting in 8 gestures for all 5 configurations, and 10 gestures for triangular and L shape configurations, summing up to 60 combinations. Out of these, the configurations, which are similar to each other have been eliminated. Reduced configurations set was, linear (3S3E), triangle (3S3E), angular (1S2E) with ±30° variation.

Gesture sets were specifically chosen to represent static poses, dynamic poses and pose paths. In addition to that, few gestures were chosen in order to compare the accuracies among different configurations. Furthermore a post-hoc analysis was used to determine the maximal gesture set size for each configuration. The swiping gestures were eliminated because they were consistently accurate during the pilot study and would be trivial to study extensively.

In the following, a formal user study according to various embodiments will be described.

12 participants were used in the study. All subjects completed tests in all 3 different configurations. This group of 12 (11 males and a female with mean age 28.3) completed the study over two days. Each study was conducted in different time of the day, enabling us to distribute those runs over different environmental conditions (ex: humidity, temperature, physical condition of the user).

The study was conducted in three separate sessions, studying each of the selected configurations in each session. For each configuration, a selected set of gestures was performed. The selection was done in a way, so that, cross validation between configurations and gesture will show the special capabilities of the configuration could be carried out. The order of the configurations and the gestures were randomized to eliminate bias. The duration of the entire experiment was between 30 mins to 45 mins (depending on the participant).

Before the start of the study, each participant was briefed about the gestures they have to perform during the study. Then they were asked to perform each gesture sequentially. During the training they were instructed to adjust their gestures in order to capture variations of the same gesture, which would be naturally acquired with the extended use. The experimenter captured 20 instances of each gesture.

During each gesture, two previously developed SVM models were employed to identify the finger location of the participant and that location sequence was captured. Then a gesture classifier was developed using the K star algorithm.

During the evaluation phase, participants were requested to perform each gesture 10 times in a random order. In the analysis, a gesture classifier (per-user) is used to classify those gestures and recorded all training and test data for post-hoc analysis.

In the following, results according to various embodiments will be described.

In the following, accuracy measures according to various embodiments will be described.

Since a custom gesture classifier was used for gesture recognition, it produced a robust classification. However, the same two SVM models were used to identify the finger location during the gesture training and testing processes. This hints to the possibility of using a common gesture classifier.

The accuracy for each gesture is measured using the number of correctly classified gestures of that type. Results showed that the accuracy for static poses exceeded 95%. Furthermore post-hoc analysis showed that a carefully selected set of gestures could improve the overall accuracy beyond 95%. In addition instances have been identified where the classifier failed to clearly distinguish between two gestures (e.g. in linear configuration with 3 sensors and 3 LEDs: Left to Right swipe (close) and Left to Right diagonal swipe).

In the following, between configuration evaluations will be described.

FIG. 8 shows an illustration 800 of cross configuration evaluation results according to various embodiments.

Two gestures (Two fingers spread and contract, Swipe diagonal) were tested for all three configurations in order to compare the accuracies among different configurations. The comparison is shown in FIG. 8. In the graph, it may be observed that the cut gesture accuracy becomes lower in the single sensor configuration. This is due to the measurement variation closer to the sensor is lower in single sensor configuration, compared to others. And the cut gesture may usually be performed at smaller spans.

In the following, between gesture set comparison will be described.

FIG. 9 shows an illustration 900 of accuracy variation with gesture set size according to various embodiments. Further analysis showed that the size of the gesture set has a significant effect on the accuracy. Accuracies with different sized gesture sets are shown in FIG. 9.

In a first session, 3 IR sensors and 3 IR LEDs were used in a linear arrangement (like shown in FIG. 6). 9 gestures in this arrangement were tested: one finger, two fingers, three fingers, Two fingers spread and contract (cut), Left to Right Swipe (close), Left to Right Swipe (far), Left to Right Swipe (diagonal), Clockwise circle, Counterclockwise circle. This setup produced accuracy results 88.15% (SD=7.93%). Post-hoc analysis showed that the removal of Left to Right Swipe (close) gesture increased accuracy to 91.04% (SD=5.92%). Further reduction in the gesture set increased the accuracy over 95%.

In a second session, 3 IR sensors and 3 IR LEDs were used in a triangular arrangement (like shown in FIG. 6). In the previous study all the gestures were measured in a 2-d plane. In contrast this triangular configuration supported measurements in 3-d space. 7 gestures were selected in order to evaluate this configuration: one finger, two fingers, three fingers, 45° Angled swipe, 90° Angled swipe, Left to Right Swipe (diagonal), Two fingers spread and contract (cut). This setup performance was 91.55% (SD=4.69). Eliminating 90° angled swipe boosted the accuracy to 94.44% (SD=4.30).

In a third session, an IR sensor and 2 IR LEDs (at an angle of 30°) were used in a linear arrangement (like shown in FIG. 6). Since only one sensor was employed, a reduced gesture set of five gestures was selected: one finger, two fingers, Left to Right Swipe (diagonal), Two fingers spread and contract (cut), Right to Left Swipe (close). Initial performance of this configuration was 92.33% (SD=4.86%). Removal of two fingers spread and contract (cut) gesture increased the accuracy to 95.62% (SD=3.38%.).

Most of the modern portable smart devices utilize a touch screen as the primary input mechanism along with the few functional buttons. For devices such as Smart Watches where the design is more integrated, the effective area available for interactions is significantly reduced, leading to critically limiting fat-finger problems and occlusion issues. Extending the interaction space with alternative interaction modalities could potentially solve this problem. Among these, free air gestures have been one of the leading frontiers.

Traditionally, gesture recognition has been developed with vision-based approaches, which consumes relatively high power since the detectable area has to be well lit (either using IR or visible light). Furthermore, since camera based systems have a minimum focusing distance, close-proximity (near the device) gestures are not recognizable. However, it is more desirable to perform gestures closer than far in a small devices.

Non-camera based gesture recognition systems have been proposed to overcome these issues. An equally spaced non-focused IR sensor emitter array may be used along the edge of a smart phone as a solution to detect gestures. Linear sampling may be used, and high number of emitters, power consumption may still be much higher compared to zSense. In another approach, a much less number of emitters, however, the detectable number of gestures are much lower compared what zSense able to detect with much lesser number of sensor/emitter combinations.

There are many other alternative gesture recognition approaches. One method is to use wearable markers. Markers can significantly reduce the processing overhead and the power ratings for camera based setups. Another approach may be to use a wearable small magnet. However, wearable markers could be undesirable for mobile settings.

A further techniques such as time of flight based three-dimensional position finding as a viable and low power technique for gesture recognition may be used. However, this technique needs high processing power and fast data acquisition techniques. Furthermore, IR sensors may have to be setup in a minimum span from each other, which can be a restricting factor for smaller devices.

In contrast, zSense may be capable of recognizing in-air close-proximity gestures while consuming low processing power and energy, which may be an ideal solution for smaller, power scares mobile devices.

According to various embodiments, in zSense, since the sensor density required to detect large area is much lower compared to traditional methods, it is ideal for mobile computing platforms. Furthermore, by selecting proper configurations of sensor-emitter combinations, space required for sensing and illumination components can be reduced significantly. In various scenarios, a single sensor with two light emitters (co-located) can accurately detect 5 different gestures. This type of small form factor gesture recognition systems are ideal for extremely integrated computing devices such as smart watches and wearable devices, where:
  a) Space required for setting the sensors system is limited;
  b) Power available to operate the system is limited; and/or
  c) computational resources available in mobile platforms are limited.

FIG. 10 shows an illustration 1000 of two application scenarios where zSense can be easily integrated and extend the interaction space of a smartphone 1002 and/or a smart watch 1004 according to various embodiments. Since the IR emitters and sensors can be made relatively much smaller (than what we used in the prototype), at industrial scale, zSense sensor modules would be able to easily embedded into the gap between the screen and the edge of a smart phone 1002 or in the edge of a smart watch 1004.

According to various embodiments, zSense may detect gestures in shaded outdoor areas.

According to various embodiments, with changing the power of emitters, the range may be increased. Directional sensors and optical components may be used to increase the detection quality.

zSense may detect a default gesture set without having to train per user.

According to various embodiments, user dependent training may be provided for more precise user specific gesture recognition.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A gesture recognition device comprising:
    a plurality of emitters, each emitter configured to emit a signal;
    at least one receiver configured to receive signals emitted by the plurality of emitters;
    a controller configured to control the plurality of emitters to subsequently emit signals in a plurality of patterns, wherein the signals are emitted to a target location;
    wherein the plurality of patterns is equal to $2^m-1$ different patterns;
    wherein "m" refers to the number of emitters in said plurality of emitters;
    wherein each pattern of the plurality of patterns include at least one signal emitted from one emitter of the plurality of emitters;
    wherein each of the at least one receiver is configured to receive signals in the plurality of patterns emitted to the target location;
    wherein the controller is configured to periodically repeat the plurality of patterns; and
    a gesture recognition circuit configured to determine a gesture of a user of the gesture recognition device based on the signals received by the at least one receiver.

2. The gesture recognition device of claim 1,
    wherein the plurality of emitters are provided in at least one of a plane, a triangular shape, a L-shape or on a line.

3. The gesture recognition device of claim 2,
    wherein the gesture recognition device comprises the at least one receiver provided in a plane.

4. The gesture recognition device of claim 1,
    wherein the plurality of emitters are provided facing at least one of a common direction or a pairwise angularly displaced direction.

5. The gesture recognition device of claim 1,
    wherein the plurality of emitters comprises a plurality of infrared emitters or a plurality of ultrasonic sensors.

6. The gesture recognition device of claim 5,
    wherein each of the plurality of infrared emitters is configured to emit infrared light.

7. The gesture recognition device of claim 1,
    wherein each of the at least one receiver is configured to receive infrared light.

8. The gesture recognition device of claim 1,
    wherein each of the at least one receiver is configured to provide an electrical signal based on the signals received from the plurality of emitters.

9. The gesture recognition device of claim 1,
    wherein the gesture recognition circuit is configured to classify gestures of the user into a plurality of classes.

10. The gesture recognition device of claim 9, further comprising:
    a training circuit configured to train the gesture recognition circuit.

11. A gesture recognition method comprising:
    a plurality of emitters each emitting a signal;
    receiving signals emitted by the plurality of emitters in at least one receiver;
    a controller controlling the plurality of emitters to subsequently emit signals in a plurality of patterns, wherein the signals are emitted to a target location;
    wherein the plurality of patterns is equal to $2^m-1$ different patterns;
    wherein "m" refers to the number of emitters in said plurality of emitters;

wherein each pattern of the plurality of patterns include at least one signal emitted from one emitter of the plurality of emitters;

wherein each of the at least one receiver is configured to receive signals in the plurality of patterns emitted to the target location;

wherein the controller periodically repeats the plurality of patterns; and determining a gesture of a user of a gesture recognition device based on the signals received by the at least one receiver.

12. The gesture recognition method of claim 11, wherein the plurality of emitters are provided in at least one of a plane, a triangular shape, a L-shape or on a line.

13. The gesture recognition method of claim 12, receiving signals emitted by the plurality of emitters in the at least one receiver provided in a plane.

14. The gesture recognition method of claim 11, wherein the plurality of emitters are provided facing at least one of a common direction or a pairwise angularly displaced direction.

15. The gesture recognition method of claim 11, wherein the plurality of emitters comprises a plurality of infrared emitters or a plurality of ultrasonic sensors.

16. The gesture recognition method of claim 15, wherein each of the plurality of infrared emitters emits infrared light.

17. The gesture recognition method of claim 11, wherein each of the at least one receiver receives infrared light.

18. The gesture recognition method of claim 11, wherein each of the at least one receiver provides an electrical signal based on the signals received from the plurality of emitters.

19. The gesture recognition method of claim 11, further comprising:
classifying gestures of the user into a plurality of classes.

20. A non-transitory computer-readable medium including program instructions which when executed by a processor cause the processor to perform the gesture recognition method of claim 11.

* * * * *